United States Patent [19]
Cattaneo

[11] 3,952,807
[45] Apr. 27, 1976

[54] DEVICE FOR PREVENTING HORSES' HOOVES SLIDING ON ICE OR SNOW

[76] Inventor: Guiseppe Cattaneo, CH-7500, St. Moritz, Switzerland

[22] Filed: Dec. 20, 1974

[21] Appl. No.: 534,929

[30] Foreign Application Priority Data
Dec. 21, 1973 Switzerland.................. 17984/73

[52] U.S. Cl.................................. 168/28; 168/29
[51] Int. Cl.².......................................... A01L 7/02
[58] Field of Search .............. 168/28, 26, 27, 13, 168/14, 16

[56] References Cited
UNITED STATES PATENTS

| 188,808 | 3/1877 | McBarren | 168/16 |
| 813,596 | 2/1906 | Stephensmeier | 168/26 |
| 1,169,324 | 1/1916 | Dunning | 168/28 |
| 3,628,608 | 12/1971 | Sherman | 168/14 |

*Primary Examiner*—Louis G. Mancene
*Assistant Examiner*—J. Q. Lever
*Attorney, Agent, or Firm*—Elliott I. Pollock

[57] ABSTRACT

Anti-snow and anti-ice protection for horses hooves in which an insert is provided in the horse-shoe and part of the elastically deformable U-shaped insert conforming to and coextensive with the inside edge of a horse-shoe and in resilient engagement with the sole of a horse's hoof is partly clamped between the horse-shoe and the sole of the hoof.

10 Claims, 12 Drawing Figures

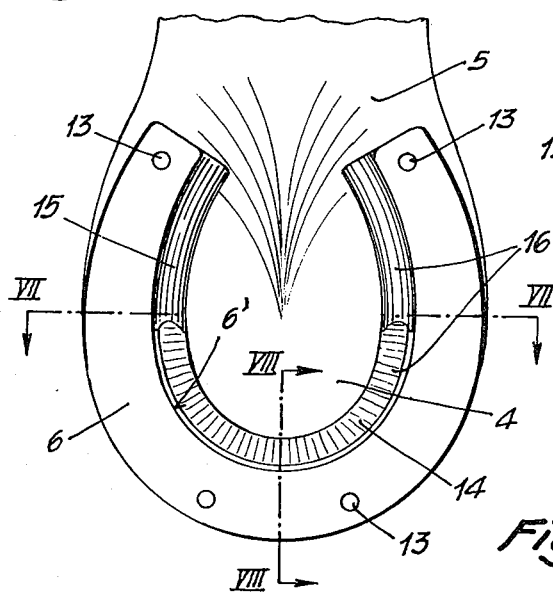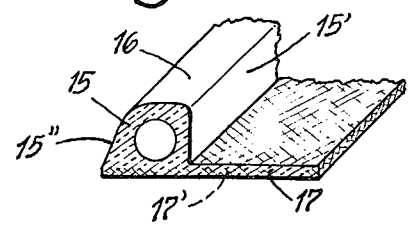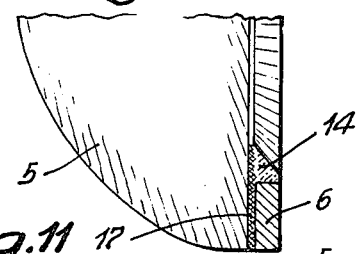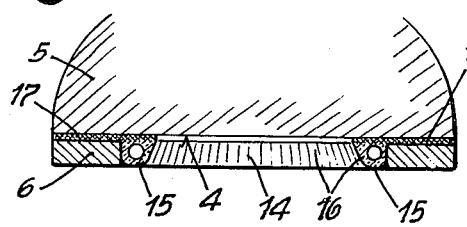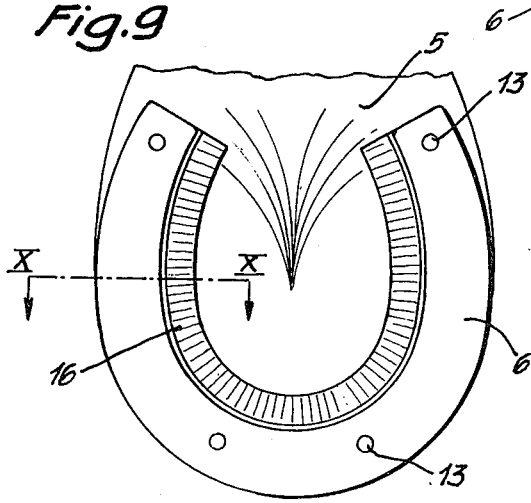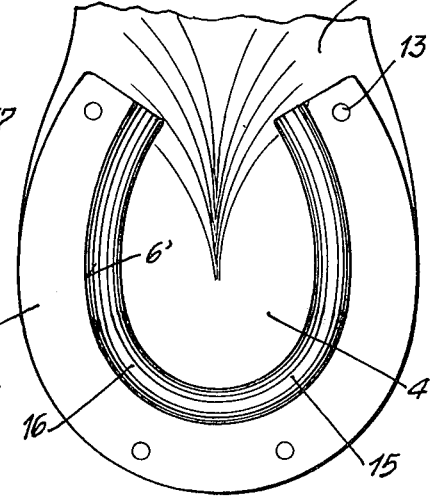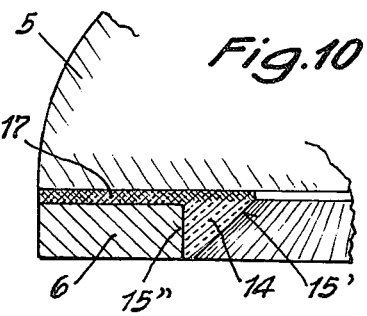

DEVICE FOR PREVENTING HORSES' HOOVES SLIDING ON ICE OR SNOW

BACKGROUND OF THE INVENTION

1. Field of the Invention

This invention relates to anti-snow and anti-ice protection for horses hooves.

Snow entering between the sole of the hoof and the horse-shoe frequently becomes soggy so that it can freeze to the horse-shoe, which soon leads to lumps forming on the sole of the hoof. These lumps impair the gait of the horse, cause pain, have a detrimental effect on the motion and increase the hazard of slipping and thus of falling.

2. Description of the Prior Art

Horse-shoe inserts are already known. According to one proposal a piece of fabric or leather is attached to the hoof so as to lie within the inner space defined by the horse-shoe. It has further been proposed to releasably clamp to the hoof, by means of a spring bracket, a pocket consisting of leather or plastics material which fills in the inner space of the horse-shoe. Such embodiments are not permanently satisfactory since no actual action of repelling snow and ice is derived from the inserts in the region of the horse-shoe.

SUMMARY OF THE INVENTION

In the anti-snow and anti-ice protection means of the present invention, part of the insert is partly clamped between the horse-shoe and the sole of the hoof.

BRIEF DESCRIPTION OF THE DRAWING

Exemplary embodiments of the subject of the invention are illustrated in the drawing in which:

FIG. 6 is a view from the side of the sole of a fifth embodiment of the hoof provided with the anti-snow and anti-ice protection means, FIG. 7 shows a cross-section along line VII—VII of FIG. 6, FIG. 8 shows a partial cross-section along line VIII—VIII of FIG. 6, FIG. 9 is a view from the side of the sole of a sixth embodiment of the hoof provided with the protection means, FIG. 10 shows a cross-section taken along line X—X of FIG. 9, FIG. 11 is a view from the side of the sole of a seventh embodiment of the hoof provided with the protection means, and FIG. 12 is an illustration in perspective of a portion of the profile of the insert of FIG. 11.

DESCRIPTION OF THE PREFERRED EMBODIMENTS

Figure 1:
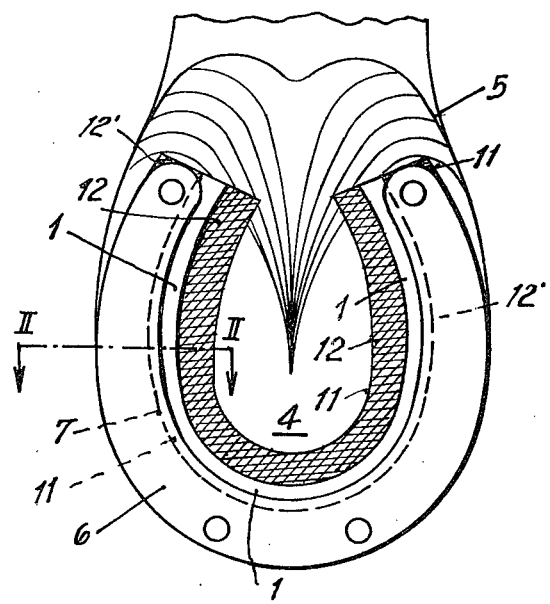
FIG. 1 is a view from the side of the sole of the horse-hoof provided with a first anti-snow and anti-ice protection means.
Figure 2:
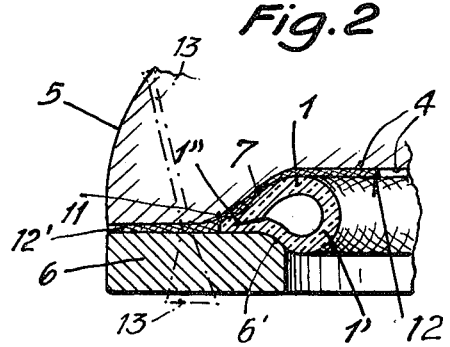
FIG. 2 shows, on enlarged scale, a partial cross-section taken along the line II—II of FIG. 1.
Figure 3:
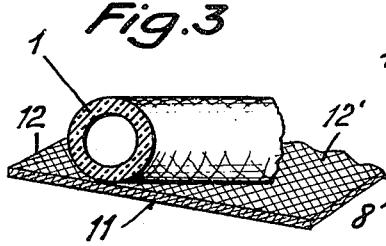
FIG. 3 shows in cross-section part of the tubular insert of a second embodiment.

Unlike known embodiments the present anti-snow and anti-ice protection means has no steel spring bracket for mounting to the hoof of the horse. According to FIG. 1 to 4 the insert has a tube 1 made of thermally insulating material and constrained by partial clamping in a groove 7 between the sole 4 of the hoof and the horse-shoe 6. The groove 7 is formed by the somewhat inwardly projecting inside and the ground off portion 6' of the upper inner edge of the horse-shoe. As is shown in FIG. 1 to 3 the tube 1 is provided with a flap 11 of a fabric which tangentially contacts the tube and is firmly bonded thereto by adhesive or other means. As is apparent from FIG. 2 the tube 1 and the flap 11 adhere to the hoof 5. The shorter end portion 12 of the flap 11 protrudes into the interior of the hoof, the longer end portion 12' on the other hand is situated between the sole of the hoof and the horse-shoe and the median section is situated in the region of the groove 7. The insert or the tube 1 and the flap 11 are affixed during the shoeing of the horse. Additionally, the inserted hobnail 13, shown in dot-dash lines in FIG. 2, penetrates through the end portion 12' of the flap 11 present between the horse-shoe 6 and the sole 4 of the hoof. In the deformed state the underside of the cross-sectional portion 1' projecting into the hollow space of the sole 4 lies free and by virtue of its rubber-elastic properties this portion 1' can, when the horse walks, swing upwardly and downwardly and counteract the adhesion of snow and ice. The terminal portion 12 of the flap 11 which projects inwardly relative to the cross-sectional portion 1' also adheres to the sole 4, as is apparent from FIG. 2; when the horse walks this portion 12 can, because of its own weight, assume a slightly inwardly and downwardly inclined attitude and moves upwards and downwards.

Figure 4:
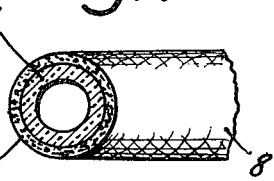
FIGS. 4 and 5 each show a cross-section of parts of the insert of further embodiments.

According to FIG. 4 the tube 1 is additionally provided with a wrapping 8 of fabric or some other thermally insulating material, e.g. fibres, which is particularly advantageous under conditions of severe cold.

Figure 5:
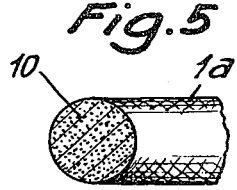

According to FIG. 5 the insert is replaced by a cord 1a having a solid cross-section 10. The cord 1a may also be provided with a wrapping 8 of woven fabric, as in FIG. 4. The mounting of the cord 1a is analogous to that shown in FIG. 2.

With the embodiments of FIG. 1 to 5 the protection means which has been described is left on the hoof of the horse until the horse-shoe is worn-out.

The flap 11 of FIGS. 1 to 3 contributes to heat-insulating protective effect against snow and ice. Advantageously the tube 1 of FIG. 4 and the cord 1a of FIG. 5 also possess a flap 11 as shown in FIGS. 1 to 3.

The flap 11 in the deformable region of the cross-sectional portion 1' and its free end portion 12 largely join in the play movements of the tube 1 or the cord 1a and by their upward and downward swinging movements they assist the repulsion of snow and ice during walking.

The insert shown in FIGS. 6 to 12 can be fitted to any hoof, i.e. without having to apply the ground off portion 6' (FIG. 2) at the upper inside edge of the horse-shoe 6, since the formation of a groove 7 for mounting the insert is not necessary.

This simplification in fitting the insert is attained in that a bulge-like enlarged portion 16 of triangular cross-section 14, FIG. 10, or tubular cross-section 15, FIG. 12, or part-triangular 14 and part-tubular 15 cross-section which intimately contacts the inner edge 6' of the horse-shoe is provided with a tangential, flange-like securing flap 17 intended to engage between the sole 4 of the hoof and the horse-shoe 6. During affixing of the horse-shoe 6 this securing flap 17 is penetrated and clamped by the nails 13 joining the horse-shoe 6 to the hoof 5 so that the insert is secured in its position, notwithstanding any strains. The insert 16, 17 preferably consists of rubber and due to its resiliently deformable properties, by virtue of compression, it is capable of optimally performing the task of repelling snow and ice from the sole of the hoof.

The semicircular front portion of the part 16 of the insert of FIG. 6 is of triangular cross-section 14, as can be seen in FIG. 8, while the two rear portions forming the U-legs are of tubular cross-section 15. The part 16 of the insert intimately contacts both the inside 6' of the horse-shoe 6 and that of the sole 4 of the hoof. Due to its elastic deformability it prevents any ingress and freezing of snow and ice between horse-shoe and sole of the hoof, as well as the formation of lumps of ice on the sole.

As is apparent from FIG. 9, the insert 16, 17 which is to be secured to the hoof by means of the flange-like flap 17 may have a bulge-like thickened portion 16 having a uniformly triangular cross-section 14, as shown in FIG. 10, along all of the region contacting the inside 6' of the horse-shoe.

Alternatively, the insert 16, 17 may have a tubular cross-section as per FIGS. 11 and 12 along all the region contacting the inside 6' of the horse-shoe.

Preferably both the triangular section as well as the tubular section have at their outer side a perpendicularly offset surface 15' (FIGS. 10 and 12) intimately adhering to the inside 6' of the horse-shoe and at the inner side a sloping surface 15'' forming an obtuse angle with the sole 4 of the hoof, which prevents ice and snow lumps forming on the sole of the hoof.

The insert 16, 17 according to embodiments of FIGS. 6, 9 and 11 is of resilient material, preferably rubber. The flange-like securing flap 17 received between horse-shoe 6 and sole 4 of the hoof which is firmly clamped and through which the hobnails 13 pass forms a coherent whole with the profile portion 16 and is provided with a fabric lining 17' (FIG. 12) which forms a reinforcement joining the portion 16 to the flap 17.

The resilient insert 16, 17 is adapted to precisely fit the respective shape of the horse-shoe and forms an anti-snow and anti-ice protection insert which is clampingly constrained by the horse-shoe 6 and unshiftably retained by its nails 13.

I claim:

1. In combination with a horseshoe which is adapted to be affixed to the sole of a horse's hoof, a resilient U-shaped device for preventing the ingress and freezing of snow and ice between the horseshoe and hoof and for preventing the formation of lumps of ice on the sole, said U-shaped device comprising a comparatively thin, flat supporting flap oriented parallel to the upper face of said horseshoe and having a shape similar to that of said horseshoe, said flap being disposed in the region between said horseshoe upper face and the facing portion of the sole of said hoof for clamping said device in place, said horseshoe having a curved inner flange adapted to be extending below said sole in a direction transverse to the upper face of said horseshoe, the radially inner edge of said flap being located adjacent to said inner flange of said horseshoe and having substantially the same curvature as the inner flange of said horseshoe, and said device including an elastically deformable, U-shaped member which is significantly thicker than said flap and which is attached to said inner edge of said flap, said deformable U-shaped member being substantially coextensive with the curved inner flange of said horseshoe, said elastically deformable member including a first surface which extends below said flap in at least partially overlying relation to the inner flange of said horseshoe to an extent no greater than the lower face of said horseshoe and in resilient engagement with said curved inner flange of said horse-shoe, and said elastically deformable member including a second surface which extends radially inward of said flap to a limited extent and which resiliently engages said sole along a confined U-shaped arcuate region located radially inward of the inner flange of said horseshoe, the opposite ends of said U-shaped member being spaced from one another at positions closely adjacent the opposing ends of said horseshoe to leave exposed the portion of said sole radially inward of said confined arcuate region.

2. The combination of claim 1 wherein the inner surface of said horseshoe is adapted to be slanted in a direction opposite to the slant direction of the sole of said horses hoof adjacent the inner flange of said horseshoe to provide a tapered groove between said sole and said inner flange when said horseshoe is mounted on said sole, a portion of said elastically deformable member being adapted to be compressed into said tapered groove.

3. The combination of claim 1 wherein said elastically deformable member has a solid cross-section.

4. The combination of claim 3 wherein said cross-section is substantially circular.

5. The combination of claim 3 wherein said cross-section is substantially triangular.

6. The combination of claim 5 wherein said first surface is adapted to be substantially perpendicular to the sole of the hoof, said second surface is adapted to be substantially parallel to the sole of the hoof, and said triangular cross-section includes a third surface arranged to slope inwardly from a position adjacent the lower end of said first surface to the inner edge of said second surface to form an obtuse angle with the sole of the hoof.

7. The combination of claim 1 wherein said elastically deformable member has a hollow tubular cross-section.

8. The combination of claim 1 wherein said elastically deformable member includes different portions between its opposite ends which are of solid cross-section and of hollow tubular cross-section respectively.

9. The combination of claim 8 wherein said member includes a pair of hollow tubular cross-sectional portions disposed adjacent the opposite ends of said U-shaped member respectively, the solid cross-sectional portion of said member being located between said pair of hollow tubular portions.

10. The combination of claim 9 wherein said solid portion has a triangular cross-sectional shape.

* * * * *